Aug. 4, 1964 J. P. BERDROW 3,143,596

ELECTRIC WIRE CONNECTION CLIP

Filed Nov. 3, 1961 3 Sheets-Sheet 1

JOSEPH P. BERDROW
*INVENTOR.*

BY Norman L. Chalfin

*AGENT*

JOSEPH P. BERDROW
*INVENTOR.*

BY Norman L. Chalfin

*AGENT*

Aug. 4, 1964 J. P. BERDROW 3,143,596

ELECTRIC WIRE CONNECTION CLIP

Filed Nov. 3, 1961 3 Sheets-Sheet 3

JOSEPH P. BERDROW
*INVENTOR.*

BY Norman L. Chalfin

*AGENT*

United States Patent Office
3,143,596
Patented Aug. 4, 1964

3,143,596
ELECTRIC WIRE CONNECTION CLIP
Joseph P. Berdrow, 7453 Balcom, Reseda, Calif.
Filed Nov. 3, 1961, Ser. No. 150,076
3 Claims. (Cl. 174—92)

This invention relates to connecting devices for electric wires, and more particularly, to a novel connecting clip for making a permanent electrical connection between two wires without screws or solder.

When electricians interconnect pairs of wires in modern electrical wiring systems, it is customary to make these connections by wrapping the wire under a screw and tightening the screw down against a contact terminal plate. An alternative method is to wrap the wires about a lug and solder the wires to the lug. Still another method is to twist together the two wires to be connected and solder the twisted connection. Each of these methods requires considerable time to accomplish where a mass of wires must be connected together.

It is an object of this invention to provide a clip for electrically connecting two wires together without need for wrapping, soldering or screwing the wires down on terminal connectors.

It is a further object to provide a solderless wire connection clip for making electrically conductive connection between two wires.

It is a further object of this invention to provide a wire connection clip having a plurality of wire connection terminals, none of which require solder, wrapping of wires or screwing the wires down to the contact plates.

It is yet another object of this invention to provide an inexpensive wire connection clip for interconnecting two wires, the clip making the connections between the wires without manipulation of the wires in any way and providing an insulative covering therefor.

It is an even further object of this invention to provide an inexpensive plastic snap-together wire connection clip for one or more wires to interconnect the wires without wrapping, soldering or screwing down to threaded terminal blades.

These and other objects of this invention will be more fully understood from the specification which follows and the appended claims when taken together with the figures, in which:

Figure 1:
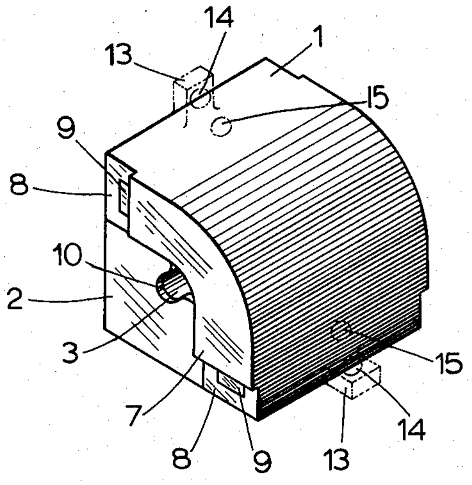
FIGURE 1 is an overall perspective view of a fully assembled clip according to this invention, as applied to a single wire connection.

The following specification for the wire clips of this invention describes the embodiments thereof for connecting single wires, double wires or three-wire units together with other one, two or three wire units. It will be clear to those skilled in the art that the clip can be made in similar fashion for four or more wires as well by repeating the configurations shown and described herein.

In all the figures, there are some elements which are shown in more than one of the figures. Whenever the same element appears in any of the figures or the embodiments of this invention shown therein, that element always bears the same reference character.

Referring now to FIGURES 1 through 6, inclusive, taken together, there is shown therein the embodiment of this invention as applied to the interconnection of two ends of a single wire connection.

An upper portion 1 of the wire clip of this invention snaps together with a lower portion 2 of the wire clip. Upper portion 1 may have mounting tabs such as 13 including mounting holes such as 14. Alternatively, threaded holes 15 may be molded therein to permit direct mounting thereof to a lower surface of a wall or other material.

Figure 2:
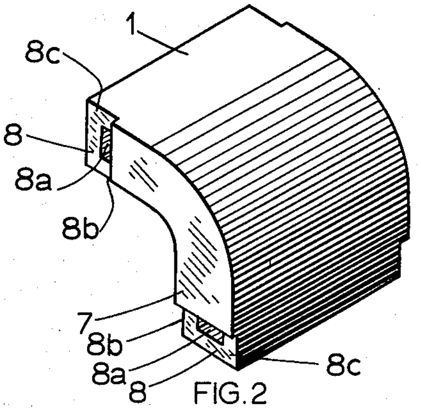
FIGURE 2 is a perspective view of the upper half of the clip shown in FIGURE 1 as seen from the outside.
Figure 3:
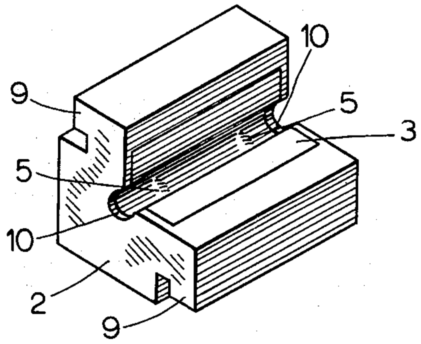
FIGURE 3 is a perspective view of the lower half of the clip shown in FIGURE 1 as seen from the inside thereof.

As may be seen in FIGURES 1 through 3 a rectangular projection 9, part of lower portion 2 of the wire clip assembly interfits into the rectangular inner area 8a of the upper portion 1 of the wire clip. The rectangular area 8a is the inner portion of a clamping section 8, part of the upper portion 1 of the wire clip. When the lower portion 2 is inserted in the upper portion 1, rectangular projections 9 interfit with clamping section 8. In the process of assembling upper portion 1 and lower portion 2, projection 9 snaps into rectangular area 8a by passing through separation 8b between the body 7 of upper 1 and clamping section 8 thereof. This occurs at both ends of the clips. The wall area 8c of clamping section 8 is sufficiently resilient and flexible to permit the distention of rectangular clamping section 8 outwardly so that projection 9 of lower portion 2 is easily able to pass through the separation area 8*b* into the rectangular inner area 8*a* whereupon clamping sections 8 snap over projections 9 at both ends of the clamp to hold the portions 1 and 2 firmly together.

A wireway contact 3 (FIGURE 1) is provided in the wire clip assembled from parts 1 and 2. Wireway contact 3 is inserted in a wireway orifice 10. Contact 3 has dimple projections 5 (FIGURE 3) so that wire 5 inserted from either side will be pressed by the dimple projections 5 for better contact when parts 1 and 2 are pressed together.

Figure 4:
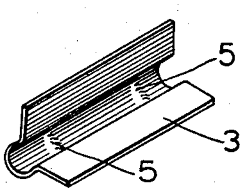
FIGURE 4 is a perspective view of a contact plate removed from the lower half of the clip shown in FIGURE 3.

In FIGURE 4 details of wireway contact 3 are shown as disassembled from lower portion 2 of the wire clip.

Figure 5:
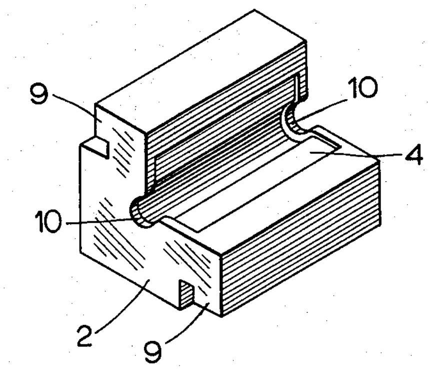
FIGURE 5 is a perspective view of the lower portion of the clip shown in FIGURE 3 with the contact plate removed.

In FIGURE 5 contact 3 has been removed from lower portion 2 to reveal the depression 4 provided therefor.

Figure 6:
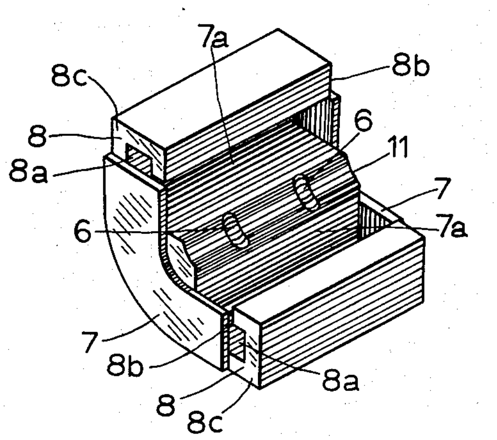
FIGURE 6 is an inside view of the upper portion of the clip of this invention.

In FIGURE 6 the upper portion 1 of the wire clip is shown as viewed from the inner side thereof. A pressure projection 11 within upper portion 1 has depression areas 6 which interfit with projections 5 shown in FIGURES 3 and 4 so that wires are clamped by projections 5 into depressions 6 when they are placed in the wire clip formed by the two halves 1 and 2.

In FIGURE 6 there may be seen the fact that side walls 7 of upper portion 1 are relatively thin and leave an undercut area 7*a* into which projections 9 (FIGURES 3 and 5) readily may be inserted when parts 1 and 2 are fitted together to clamp wires between them.

Figure 7:
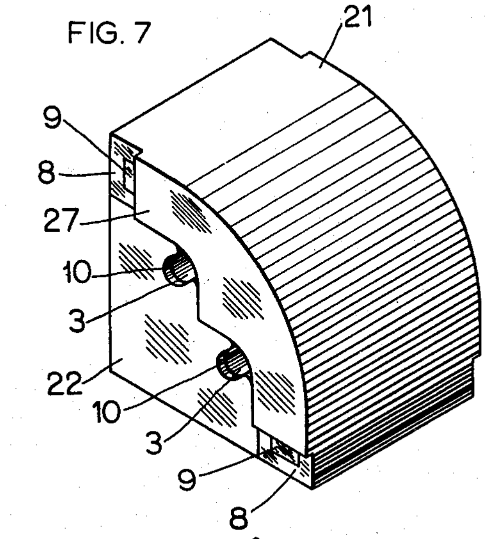
FIGURE 7 is an overall perspective view of another embodiment of the fully assembled clip of this invention as employed for two wires connected to two other wires.

In FIGURE 7 an embodiment of the wire clip of this invention is shown wherein two wires may be clamped together between the upper part 21 and lower part 22. Wireway orifices 10 each have wireway contacts 3 in them in the same manner as previously shown in FIGURES 1 through 6. In general the parts shown in FIGURE 7 correspond with those in FIGURE 1. However, where there is some slight difference necessitated by the plural utility of the component for 2 wires the part which appears in FIGURE 7 has a "2" before it as side wall 27 for the two wire article is similar to side wall 7 for the single wire article. Upper part 21 for the two wire article is similar to part 1 for the single wire article.

Figure 8:
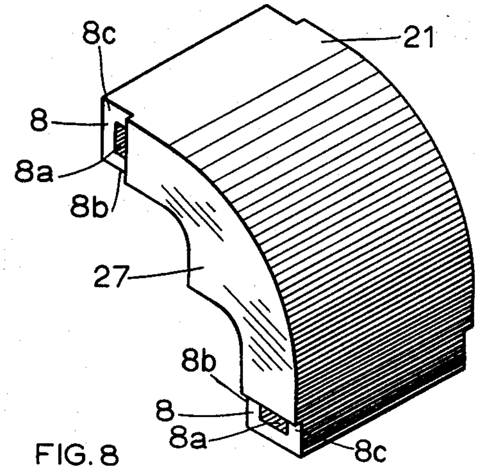
FIGURE 8 is a perspective view of the upper portion of the two wire connection clip shown in FIGURE 7, as viewed from the outside.

FIGURE 8 shows upper portion 21 separated from lower portion 22. The elements of FIGURE 8 are otherwise similar to those in FIGURE 2.

Figures 9, 10, 11:
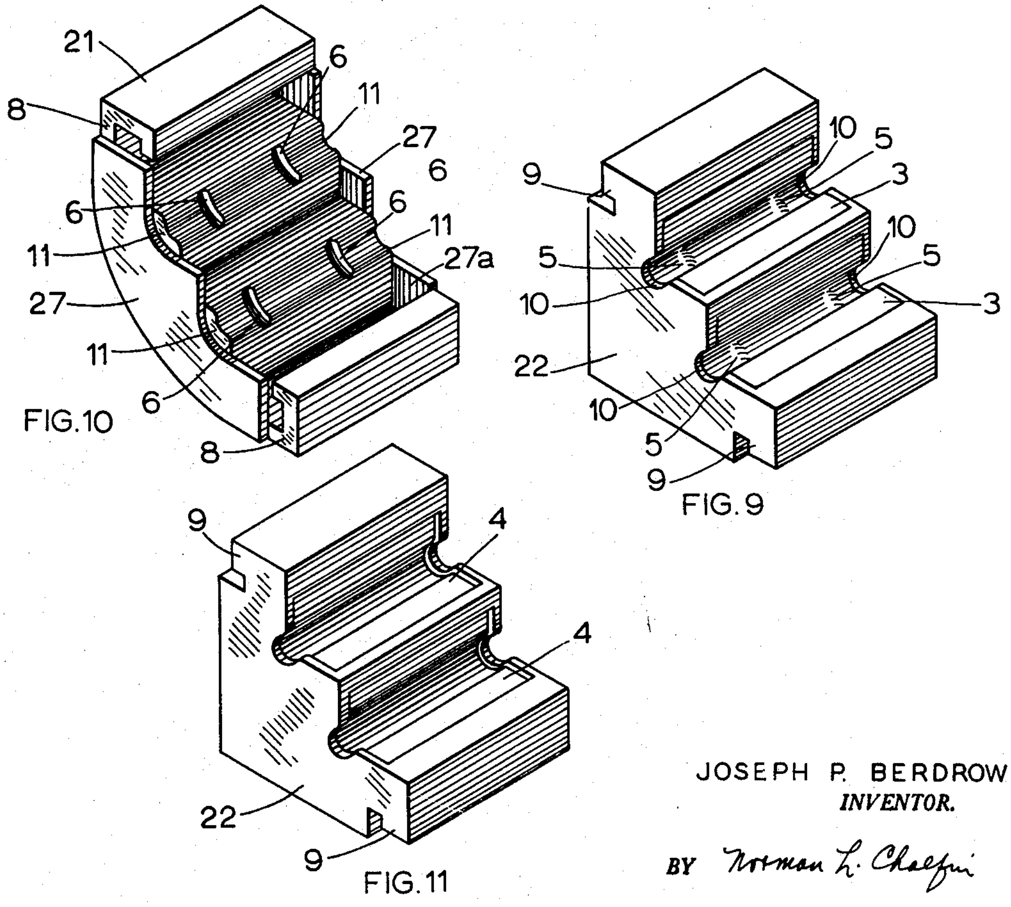
FIGURE 9 is a perspective view of the lower portion of the two wire clip of this invention as viewed from the inside.
FIGURE 10 is an inside perspective view of the upper portion of the two wire connection clip shown in FIGURE 8.
FIGURE 11 is a view of the inside of the two wire connection clip with the contact plates removed.

FIGURE 9 shows the inside view of lower portion 22 of the wire clip for two wires. It may here be seen that there is a wireway contact 3 in each of the wireway orifices 10, respectively.

FIGURE 10 shows the inner portion of the upper part 21 of the two wire clip. It may be seen that there are two of the projecting pressure areas 11 and that in the same manner as described for FIGURE 6 the side walls 27 are relatively thin providing at 27*a* an area to receive projections 9 when parts 21 and 22 are clamped together.

In FIGURE 11 it may be seen how depressions 4 are provided to receive wireway contacts 3 (such as shown in FIGURE 4).

From the above it may be clearly seen that three or more wires may be provided for with additional wire apertures such as 10 in a structure of the same configuration as shown by 7, 8, 9 etc. The structure for a plurality of wires would be the same but for the size of the article and have the plurality of wire receiving apertures and conductive insert devices.

It should be clearly understood that more than three wires can be accommodated by increasing the number of wireway orifices 10 and inserting contacts 3 therein and in each case there will be an appropriate plurality of pressure projections 11 to press wires against contacts 3 between projecting dimples 5 and depressions 6 which are juxtaposed.

Another form of wire clip employing the principles of this invention is shown in FIGURES 12 through 17.

Figure 12:
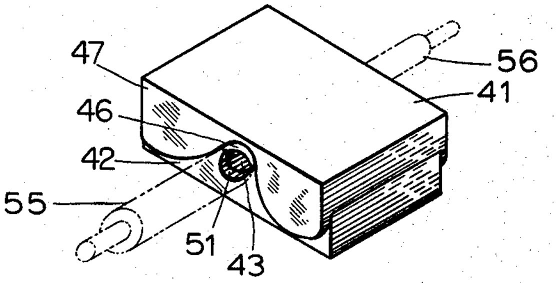
FIGURE 12 shows a further embodiment of the clip of this invention adopted to make connections with a single wire.
Figure 15:
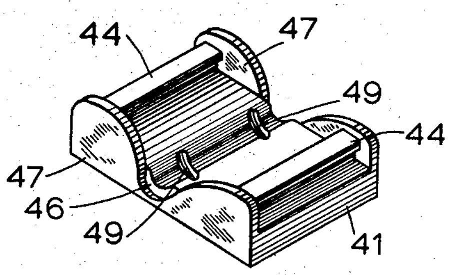
FIGURE 15 shows the same portion of the clip illustrated in FIGURE 13, viewed from the bottom thereof.
Figure 13:
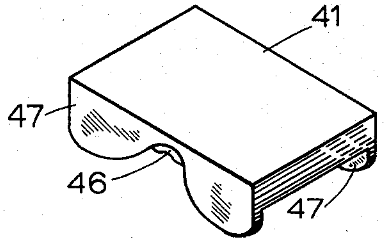
FIGURE 13 shows the top portion of the embodiment shown in FIGURE 12 viewed from the top.
Figure 16:
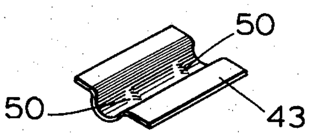
FIGURE 16 illustrates the metal contact insert part of the bottom of the clip shown in FIGURE 14.

The assembled clip shown in FIGURE 12 has an upper portion 41 and lower portion 42. Upper portion 41 has side walls 47 (as shown in FIGURES 13 and 15), and T-shaped projections 44 near either end following transversely across the upper portion and having an upper wireway through 46 in which grooves 49 are cut.

Figure 14:
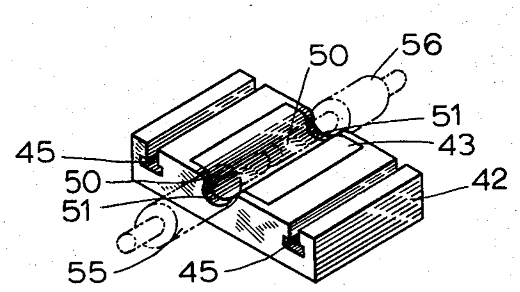
FIGURE 14 shows the bottom portion of the embodiment shown in FIGURE 12.
Figure 17:
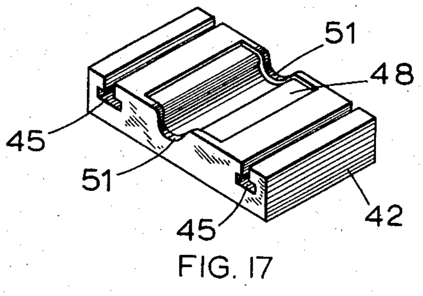
FIGURE 17 shows the portion of the clip illustrated in FIGURE 14 with the contact insert of FIGURE 16 removed.

Lower portion 42 is shown in FIGURES 14 and 17. In the former figure the lower wireway through 51 is shown in which is inserted contact plate 43 formed to fit in the molded depression 48 formed therefor as may be seen in FIGURE 17. In end positions to match the location of T-shaped projections 44 of upper portion 41 there are provided in lower portion 42 T-shaped grooves transversely positioned in lower portion 42. When pressed together the upper part 41 and lower part 42 are held together by the interfitting of T-shaped portions 44 in T-shaped grooves 45.

It may be seen that contact 43 (FIGURE 16) is similar to contact 3 (FIGURE 4) and fits in lower part 42 in the same manner as contact 3 fits in the articles previously described. In contact 43 there are dimple projections 50 which are juxtaposed with grooves 49 to crimp wires placed therein when upper and lower parts 41 and 42 respectively are clamped together.

There have been described above 4 embodiments of a wire clip which provides means for interconnecting the separate ends of one or more wires.

In FIGURES 1 through 6 a single wire clip is shown and has been described herein. In FIGURES 7 through 11 a two-wire clip has been shown and described herein. In FIGURES 12 through 16 a three-wire clip has been shown and described herein above.

The embodiment shown in FIGURES 12 through 17 is shown for a single-wire and so described but it will be obvious to anyone skilled in the art that in the same manner as described for the articles in FIGURES 1 through 11 herein the clip of FIGURES 12 through 17 can have a plurality of undulating trough-like elements such as 46, 43, 50, 51 for more than one wire.

In use wires are inserted from either side of the clips of this invention as shown in FIGURES 12–14 at 55 and 56 in dashed-in lines. Wires 55 and 56 make contact with one another on contact plate 43 and are tightly held in place by the locking action of T-shaped portions 44 in T-shaped grooves 45.

Similarly wires inserted in wireway orifices 10 of the articles shown in FIGURES 1 through 11 make contact with one another on contact plates 3 and are pressed by projections 11. The two halves of the clip as (1, 2), (21, 22), (31, 32) are held together by the interfitting of projection 9 in opening 8*a*, being forced into this area by passing under the separation provided at 8*b*. Projection 9 forces itself into the area 8*a* because of the resilience of the corner portion 8*c*.

The clips of this invention in any of the forms thereof shown and described herein are designed to be used once since they can be inexpensively made and provide a permanent connection.

What is claimed as new is:

1. A wire clip assembly comprising: a plastic, electrically non-conducting upper part having a resilient, generally rectangular clamping receptacle thereon and an electrically non-conductive lower part having generally rectangular projections thereon, said projections being positioned in interfitting and clampable relation to said receptacle; said upper and said lower parts being separable; said lower part having at least one transverse wireway trough therein and a conductive electric contact plate contoured to fit in and inserted in said trough; said upper part having at least one projecting portion transversely positioned therein in juxtaposed relation to said trough, whereby when electric wires are inserted in said trough on said contact plate from either side of said wire clip and said upper and lower parts of said clip are assembled together and clamped in their interfitting relation, said wires are firmly clamped in place against said contact plate by said transverse projection in said trough and said wires make electrical contact with one another on said contact plate.

2. The wire clip defined in claim 1 wherein said lower part has two transverse wireway troughs therein and said upper part has two projecting portions transversely positioned therein, each respectively in juxtaposed relation to a respective one of said wireway troughs.

3. The wire clip defined in claim 1 wherein said lower part has a plurality of transverse wireway troughs therein and said upper part has a plurality of projecting portions transversely positioned therein, each respectively, in juxtaposed relation to a respective one of said wireway troughs.

References Cited in the file of this patent

UNITED STATES PATENTS

| | | |
|---|---|---|
| 2,981,921 | Safford | Apr. 25, 1961 |
| 3,030,604 | Moody | Apr. 17, 1962 |

FOREIGN PATENTS

| | | |
|---|---|---|
| 507,657 | Germany | Sept. 18, 1930 |